United States Patent
Caretti et al.

(10) Patent No.: US 10,785,679 B2
(45) Date of Patent: Sep. 22, 2020

(54) METHOD AND SYSTEM FOR LOSS MITIGATION DURING DEVICE TO DEVICE COMMUNICATION MODE SWITCHING

(71) Applicant: TELECOM ITALIA S.p.A., Milan (IT)

(72) Inventors: Marco Caretti, Turin (IT); Giovanni Nardini, Pisa (IT); Dario Sabella, Turin (IT); Giovanni Stea, Pisa (IT); Antonio Virdis, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 52 days.

(21) Appl. No.: 16/300,998

(22) PCT Filed: May 13, 2016

(86) PCT No.: PCT/EP2016/060866
§ 371 (c)(1),
(2) Date: Nov. 13, 2018

(87) PCT Pub. No.: WO2017/194161
PCT Pub. Date: Nov. 16, 2017

(65) Prior Publication Data
US 2020/0128437 A1    Apr. 23, 2020

(51) Int. Cl.
*H04W 4/00* (2018.01)
*H04W 28/04* (2009.01)
(Continued)

(52) U.S. Cl.
CPC .......... *H04W 28/04* (2013.01); *H04W 76/23* (2018.02); *H04W 80/02* (2013.01)

(58) Field of Classification Search
None
See application file for complete search history.

(56) References Cited

U.S. PATENT DOCUMENTS 8,213,360 B2   7/2012   Koskela et al.
9,072,027 B2   6/2015   Vasudevan et al.
(Continued)

FOREIGN PATENT DOCUMENTS

WO    WO 2013/185528 A1    12/2013

OTHER PUBLICATIONS

International Search Report and Written Opinion dated Dec. 8, 2016 in PCT/EP2016/060866 filed May 13, 2016.
(Continued)

*Primary Examiner* — Elisabeth Benoit Magloire
(74) *Attorney, Agent, or Firm* — Oblon, McClelland, Maier & Neustadt, L.L.P.

(57) ABSTRACT

A first user equipment can communicate with a second user equipment in a direct mode or in an infrastructure mode via a base station of a network. To communicate with the second user equipment, the first user equipment generates packets and forwards the packets to a lower protocol layer of a protocol stack. The first user equipment also acts as a buffer protocol entity by storing the packets until acknowledgement of receipt is received from the second user equipment. If the first user equipment switches from the direct mode to the infrastructure mode, or vice versa, the first user equipment forwards each of the stored packets to the lower protocol layer for transmission to the second user equipment using the current mode.

15 Claims, 8 Drawing Sheets

(51) Int. Cl.
*H04W 76/23* (2018.01)
*H04W 80/02* (2009.01)

(56) References Cited

U.S. PATENT DOCUMENTS

| | | | | |
|---|---|---|---|---|
| 2007/0213060 | A1* | 9/2007 | Shaheen | H04W 36/10 455/436 |
| 2008/0095116 | A1* | 4/2008 | Kim | H04W 36/02 370/331 |
| 2012/0140704 | A1* | 6/2012 | Zhao | H04L 1/1874 370/315 |
| 2015/0009874 | A1* | 1/2015 | Edara | H04W 52/0225 370/311 |
| 2015/0334596 | A1* | 11/2015 | Szilagyi | H04W 28/0289 370/232 |
| 2017/0230928 | A1* | 8/2017 | Basu Mallick | H04W 56/0015 |
| 2017/0317740 | A1* | 11/2017 | Basu Mallick | H04B 7/15557 |
| 2019/0149365 | A1* | 5/2019 | Chatterjee | H04L 25/0226 370/329 |

OTHER PUBLICATIONS

Nardini, G. et al., "Fast and agile lossless mode switching for D2D communications in LTE-Advanced networks," 2016 IEEE 83rd Vehicular Technology Conference (VTC Spring), 2016, XP032920165, 5 pages.

* cited by examiner

METHOD AND SYSTEM FOR LOSS MITIGATION DURING DEVICE TO DEVICE COMMUNICATION MODE SWITCHING

BACKGROUND OF THE INVENTION

Field of the Invention

The present invention refers to communication systems. More particularly, the present invention relates to the field of wireless or mobile telecommunication networks. Even more particularly, the present invention relates to a system and method adapted to implement loss mitigation of transmitted data packets during device to device communication mode switching.

Overview of the Related Art

Generally, in a mobile (cellular) telecommunication network, communications among mobile communication devices (e.g., mobile telephones, smartphones and tablets)—generally referred to as User Equipment, or UE in brief—pass through the telecommunication network infrastructure: two UE, connected to respective "serving" radio transceivers of the network (e.g., radio transceivers of a same or different eNodeB—evolved Node B—in the 3GPP Long Term Evolution (LTE)/LTE Advanced (LTE-A) systems), communicate with each other by means of physical communication channel(s) that are set-up and terminated between the radio transceivers and the UE.

As an alternative to communication based on such traditional "2-hop" connection, which hereinafter will be also referred to as Infrastructure Mode (IM) connection, recently UE have been made available that are also capable of communicating directly with each other when they happen to be within a relatively short range.

This direct radio communication among UE is commonly referred to as "Device-to-Device" (D2D) communication based on a Direct Mode (DM) connection, which exploits DM connection links, or sidelinks, directly established between two (or more) UE.

DM connection differs from the IM connection in that the information is exchanged through physical communication channels that are set-up and terminated between the UE directly (i.e., comprised in the sidelinks) without passing through the infrastructure of the mobile communication network.

The sidelinks between UE communicating directly among them are generally established over frequencies comprised in a communication frequency range used for the IM connections.

Due to mobility of the UE and the necessity of spectrum reuse within the mobile communication network, it is necessary to allow a DM connection to be reverted to an IM connection and back from an IM connection to a DM connection.

In facts, channel conditions on the sidelinks may deteriorate (e.g., because the two UE are moving away from each other), or the same spectrum could be claimed back by the eNodeB to be used for other, communication data flows managed by the latter in order to avoid strong interferences.

In such occurrences, either the current connection may be aborted (disrupting the ongoing communication) or it is switched from DM to IM.

Unfortunately, in conventional mobile communication networks a loss of Protocol Data Units (PDUs, i.e. packets of data outputted by a protocol stack layer) during a mode switch (i.e., a switch from a DM connection to a IM connection or vice versa) is unavoidable, since it is due to the Packet Data Convergence Protocol (PDCP) and Radio Link Control (RLC) structure and procedures generally implemented in the mobile communication network.

Generally, three network elements are involved in a mode switch: a transmitter UE, a receiver UE, and an eNodeB managing communications in the cell(s) in which the UE are located.

If a D2D communication is ongoing on a sidelink, then the transmitter UE and the receiver UE have a PDCP peering established. In other words, PDCP PDUs (i.e., PDUs generated at the PDCP layer) transmitted by the transmitter UE have a coherent sequence numbering and a consistent ciphering/deciphering keys so that the receiver UE is able to identify and to arrange in a correct order the PDCP PDUs received from the transmitter UE.

Conversely, two different PDCP peering must be used in IM connection: one between the transmitter UE and the eNodeB (i.e., the UL leg of the communication), another between the eNodeB and the receiver UE (i.e., the DL leg of the communication).

When a mode switch occurs, a new PDCP peering has to be established, because in IM connection the ciphering/deciphering occurs separately hop-by-hop, and the same set of ciphering/deciphering keys used for the DM connection cannot be used for both the UL and the DL legs of the IM connection in order to avoid communication malfunctions.

Moreover, during a transmission PDCP PDUs are received at the RLC layer of the transmitter UE as RLC Service Data Units (SDU, i.e. packets of data inputted to a protocol stack layer) where they are encapsulated and, possibly segmented, in corresponding RLC PDUs which are passed to the MAC layer for being transmitted.

For this reason, also a peering at the RLC layer has to be established between the transmitter UE and the receiver UE in DM connection, or between the transmitter UE and the eNodeB and between the latter and the receiver UE in IM connection.

Accordingly, the sequence numbers of RLC PDUs cannot be assumed to be synchronized after a mode switch from a DM connection to an IM connection or vice versa, i.e. the sequence numbers of RLC PDUs of the DM connection is not synchronized with the sequence numbers of RLC PDUs of the UL or the DL legs of the IM connection.

Particularly, RLC PDUs received by the receiver UE during a DM connection have different sequencing number and ciphering/deciphering keys with respect to RLC PDUs received by the receiver UE during an IM connection.

Having separate RLC peering (i.e., synchronization between transmitting and receiving network elements) for the DM and the IM connections implies that, after a mode switch, each RLC PDU in the transmitter UE that is waiting to be transmitted according to the "old" peering (e.g., RLC PDUs generated to be transmitted through a DM connection) is completely useless, not being correctly identified at the receiver UE and is discarded.

In addition, each RLC PDU already generated for being transmitted according to the "old" peering cannot be transmitted according to the "new" peering (e.g., RLC PDU generated to be transmitted through an IM connection), since the RLC PDU is already ciphered using the wrong ciphering keys (i.e., the ciphering keys for the DM connection are generally different than that used for the IM connection).

Moreover, segments of RLC SDUs (encapsulated in corresponding RLC PDUs) that have been already received at the receiver UE at the time of the mode switch are to be discarded as well (i.e., at least at the expiry of a RLC reassembly timeout of the receiver UE), since their missing counterparts, buffered at the transmitter UE according to the "old" peering, cannot be correctly received as described above.

Such losses may have heavy repercussions on communication effectiveness.

For example, UDP-based multimedia flows, such as video or voice data streams, are highly sensitive to losses, which impair the quality of experience of the final user.

Similarly, TCP-based applications are extremely sensitive to losses, which are treated by TCP protocol as congestion signals, thereby reducing the congestion window and thus the throughput. Thus, several TCP applications perceiving a (n alleged) congestion signal simultaneously cause a major, long-lasting and unnecessary reduction of aggregate (cell) throughput.

Handover procedures cannot be effectively implemented during mode switches, since they would imply high latencies.

In addition, it should be noticed that mode switches may be frequent (e.g., in the order of few seconds) according to UE movement and resource availability of the mobile communication network, i.e. generally much more frequent than handovers between eNodeBs, and—unlike the latter—may interest several data flows at the same time, possibly the data flows occurring within an entire cell managed by an eNodeB, since switching a data flow from the DM connection to the IM connection (or vice versa) may have far-reaching consequences on other data flows provided within the same (and possibly neighboring) cell(s).

Therefore, handover techniques implemented in DM-IM connection mode switching would also sensibly complicating the management of the whole mobile communication network.

It should be noted that the terms "mode switching" and "DM-IM connection mode switching" are herein used, for the sake of conciseness to denote both switching from a DM connection to an IM connection and, vice versa, switching from an IM connection to a DM connection in a communication between UE.

In the art some expedients for mitigating issues related to DM-IM connection mode switching have been proposed.

For example, U.S. Pat. No. 8,213,360 discloses a method that comprises receiving a control command to switch from a first communication mode to a second communication mode from a coupled controller; reconfiguring a plurality of protocol entities including at least a first protocol buffer and a second protocol buffer; moving remaining data packets in the first protocol buffer into at least the second protocol buffer; communicating a current data packet sequence number; and forwarding data in the second communication mode.

U.S. Pat. No. 9,072,027 discloses a method of facilitating path switching, for a communication path between a first UE and a second UE, from a device to device path to network path. The method includes receiving switch point information from the first UE that identifies a data block; establishing, at the access network, a connection with the first UE over an uplink path between the first UE and the access network; establishing, at the access network, a connection with the second UE over a downlink path between the network element and the second UE; setting, at the access network, a data block sequencing numbering to be the same for the uplink path and the downlink path based on the switch point information; and forwarding, at the access network, data from the first UE to the second UE via the network path, the network path including the uplink path and the downlink path.

SUMMARY OF THE INVENTION

The Applicant has observed that, generally, the expedients known in the art are not able to provide for a satisfactory transition between DM and IM connections and vice versa between IM and DM connections during a communication between UE.

Particularly, the applicant has noted that the expedients proposed in U.S. Pat. No. 8,213,360 requires additional signaling for implementing re-synchronization of sequence numbers to be used for transmission after a mode switch. Moreover, sending all the data contained in the protocol buffer of the transmitting UE to the eNodeB may result in excessive overhead in case a part of the buffer has already been received by the peering With respect to the expedients proposed in U.S. Pat. No. 9,072,027 the Applicant has observed that, also in this case, additional signaling is required for re-synchronizing sequence numbers after a mode switch. Furthermore, it is noted that the transmission is interrupted for a certain time during the mode switch.

The Applicant has therefore tackled the problem of how to implement Device-to-Device (D2D) communications and integrate D2D communications in a mobile communication network framework in an effective way.

Further, the Applicant has tackled the problem of how to implement a mode switching between Direct Mode (DM) to Infrastructure Mode (IM) connections and vice versa with minimal modifications to the protocol stack.

The Applicant has further tackled the problem of implementing DM-IM connection mode switching operating at one or more predetermined layers of protocol layers in a way that is transparent to the upper protocol layers of the receiver.

Particularly, one aspect of the present invention proposes a method for managing data packets transmitted by a first user equipment to be received by a second user equipment is proposed. The first user equipment is arranged for communicating with the second user equipment in a direct mode by directly connecting to the second user equipment or in an infrastructure mode by connecting to the second user equipment through a radio transceiver station of a radio network. The first user equipment is configured for generating data packets at an Internet Protocol layer of the protocol stack to be transmitted; forwarding each data packet to a lower protocol layer of the protocol stack in order to be sent to the second user equipment in direct mode or in infrastructure mode, providing at least one buffer protocol entity below the Internet Protocol layer. The at least one buffer protocol entity is arranged for storing a copy of each data packet forwarded from the Internet Protocol layer to the lower protocol layer; removing the copy of a data packet stored in the buffer protocol entity upon acknowledge of the receipt of the corresponding data packet at the second user equipment, and in case the first user equipment switches from communicating with the second user equipment in the direct mode to the infrastructure mode or, vice versa, from the infrastructure mode to the direct mode, forwarding the copy of each data packet comprised in the buffer protocol entity to the lower protocol layer of the protocol stack in order to be sent to the second user equipment in infrastructure mode or in direct mode, respectively.

Preferred features of the present invention are set in the dependent claims.

In one embodiment of the present invention, forwarding each data packet to a lower protocol layer of the protocol stack comprises forwarding each data packet to a Packet Data Convergence Protocol layer of the protocol stack.

In one embodiment of the present invention, providing at least one buffer protocol entity below the Internet Protocol layer comprises providing the at least one buffer protocol entity at sublayer provided between the Internet Protocol layer and the Packet Data Convergence Protocol layer of the protocol stack.

In one embodiment of the present invention, providing at least one buffer protocol entity below the Internet Protocol layer comprises providing the at least one buffer protocol entity at the Packet Data Convergence Protocol layer of the protocol stack.

In one embodiment of the present invention, the method further comprises for each data packet generated at the Internet Protocol layer, generating at least one respective data packet at each protocol layer of the protocol stack lower than the Internet Protocol layer. In addition, removing the copy of a data packet stored in the buffer protocol entity upon acknowledge of the receipt of the corresponding data packet at the second user equipment comprises identifying each data packet at each protocol layer the protocol stack lower than the Internet Protocol layer which has been generated based on the data packet.

In one embodiment of the present invention, generating at least one respective data packet at each protocol layer comprises generating at least one first respective data packet at the Packet Data Convergence Protocol layer based on a data packet generated at the Internet Protocol layer; generating at least one second respective data packet at a Radio Link Control layer based on each first respective data packet generated at the Packet Data Convergence Protocol layer, and generating at least a third respective data packet at a Medium Access Control layer based on each second respective data packet generated at the Radio Link Control layer. In addition, identifying each data packet at each protocol layer the protocol stack lower than the Internet Protocol layer comprises storing identifying information of the at least one first respective data packet, the at least one second respective data packet, and at least a third respective data packet.

In one embodiment of the present invention, storing identifying information of the at least one first respective data packet, the at least one second respective data packet, and at least a third respective data packet comprises storing a sequence number identifying the at least one respective data packet, the at least one second respective data packet, and the at least a third respective data packet in a sequence of data packets at the respective protocol layer.

In one embodiment of the present invention, for each at least a third respective data packet at a Medium Access Control layer a receipt acknowledgement process is implemented for assessing a receipt of the data packet at the a second user equipment. In addition, storing identifying information of the at least one first respective data packet, the at least one second respective data packet, and at least a third respective data packet further comprises storing an identifier of a receipt acknowledgement process for each at least a third respective data packet.

In one embodiment of the present invention, removing the copy of a data packet stored in the buffer protocol entity upon acknowledge of the receipt of the corresponding data packet at the second user equipment comprises receiving acknowledgement of receipt at the at the Medium Access Control layer; checking whether an acknowledgement of receipt associated with each corresponding stored identifier of a receipt acknowledgement process has been received, and in the affirmative case, removing the copy of a data packet stored in the buffer protocol entity.

In one embodiment of the present invention, removing the copy of a data packet stored in the buffer protocol entity upon acknowledge of the receipt of the corresponding data packet at the second user equipment comprises, once that an acknowledgement of receipt associated with each corresponding stored identifier of a receipt acknowledgement process has been received, generating a data packet receipt confirmation at the Medium Access Control layer; forwarding the packet receipt confirmation to the Packet Data Convergence Protocol layer, and generating a removal signal at the Packet Data Convergence Protocol layer for the buffer protocol entity signaling to remove the data packet.

In one embodiment of the present invention, at each protocol layer at least one protocol entity is implemented for generating and managing the at least one first respective data packet, the at least one second respective data packet, and at least a third respective data packet. In addition, storing identifying information of the at least one first respective data packet, the at least one second respective data packet, and at least a third respective data packet comprises storing said identifying information in a memory area accessible by protocol entities at each protocol layer.

In one embodiment of the present invention, storing said identifying information in a memory area accessible by protocol entities at each protocol layer comprises having at least one protocol entity at the Packet Data Convergence Protocol layer storing in the memory area an identifying information of the at least one first respective data packet; having at least one protocol entity at the Radio Link Control layer storing in the memory area an identifying information of the at least one second respective data packet, and having at least one protocol entity at the Medium Access Control layer storing in the memory area an identifying information of the at least one third respective data packet.

In one embodiment of the present invention, storing an identifier of receipt acknowledgement for each at least a third respective data packet comprises having at least one protocol entity at the Medium Access Control layer storing in the memory area an identifier of a receipt acknowledgement process for each at least a third respective data packet.

In one embodiment of the present invention, the method further comprises having at least one protocol entity at the Medium Access Control layer storing in the memory area an confirmation information for each identifier of a receipt acknowledgement process.

Another aspect of the present invention a user equipment arranged for transmitting to and/or receiving from a further user equipment data packets is proposed. Data packets are transmitted and/or received by means of a Direct Mode connection in which data packets are directly transmitted to and/or received from the further user equipment or by means of an Infrastructure Mode connection in which data packets are transmitted to and/or received from the user equipment and the further user equipment through a radio transceiver station of a radio network. The user equipment comprises hardware, firmware, a combination of hardware and software, or software configured for implementing the method of above.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1A:
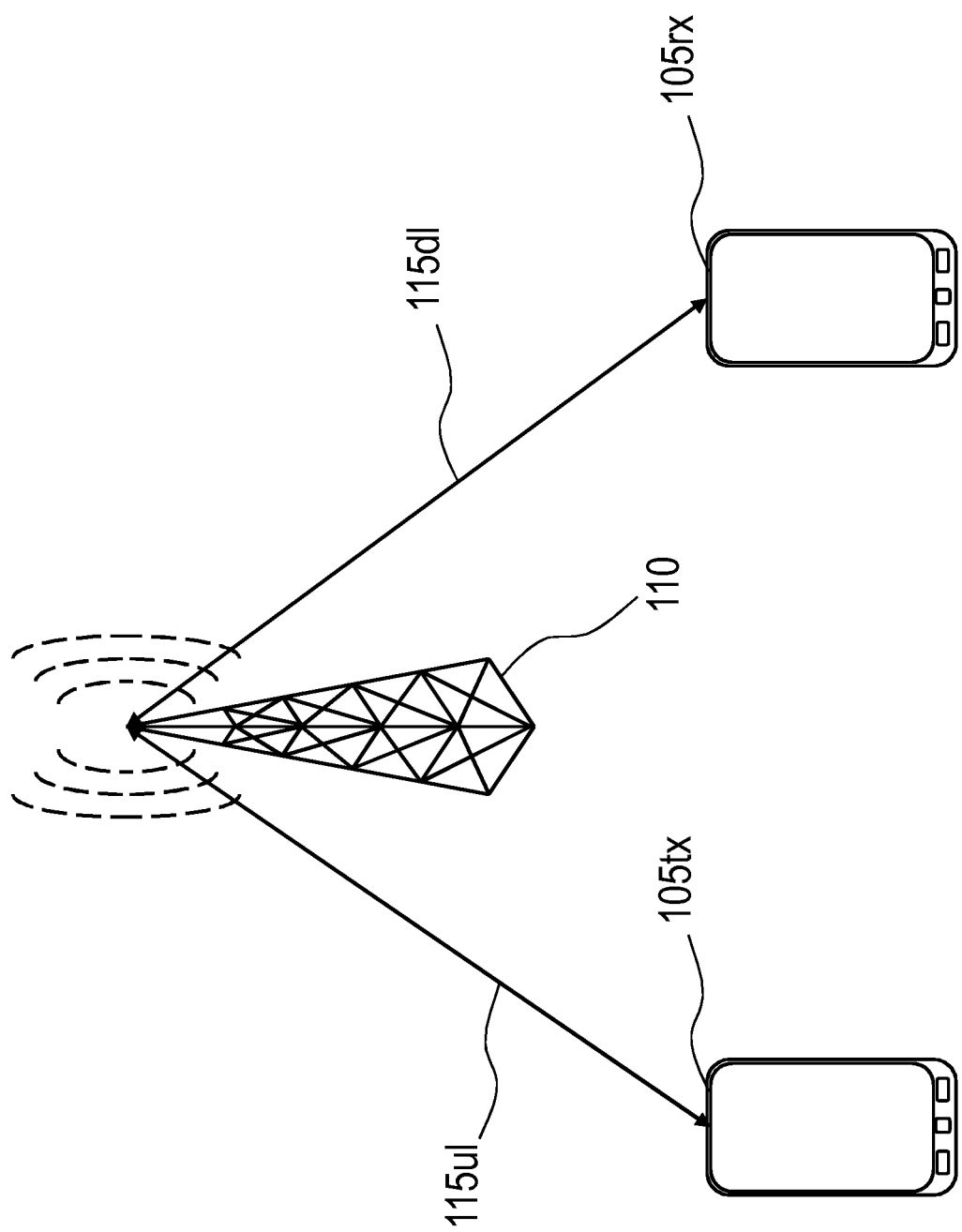
FIG. 1A is a radio network arrangement in which two User Equipment communicate through an Infrastructure Mode connection.
Figure 1B:
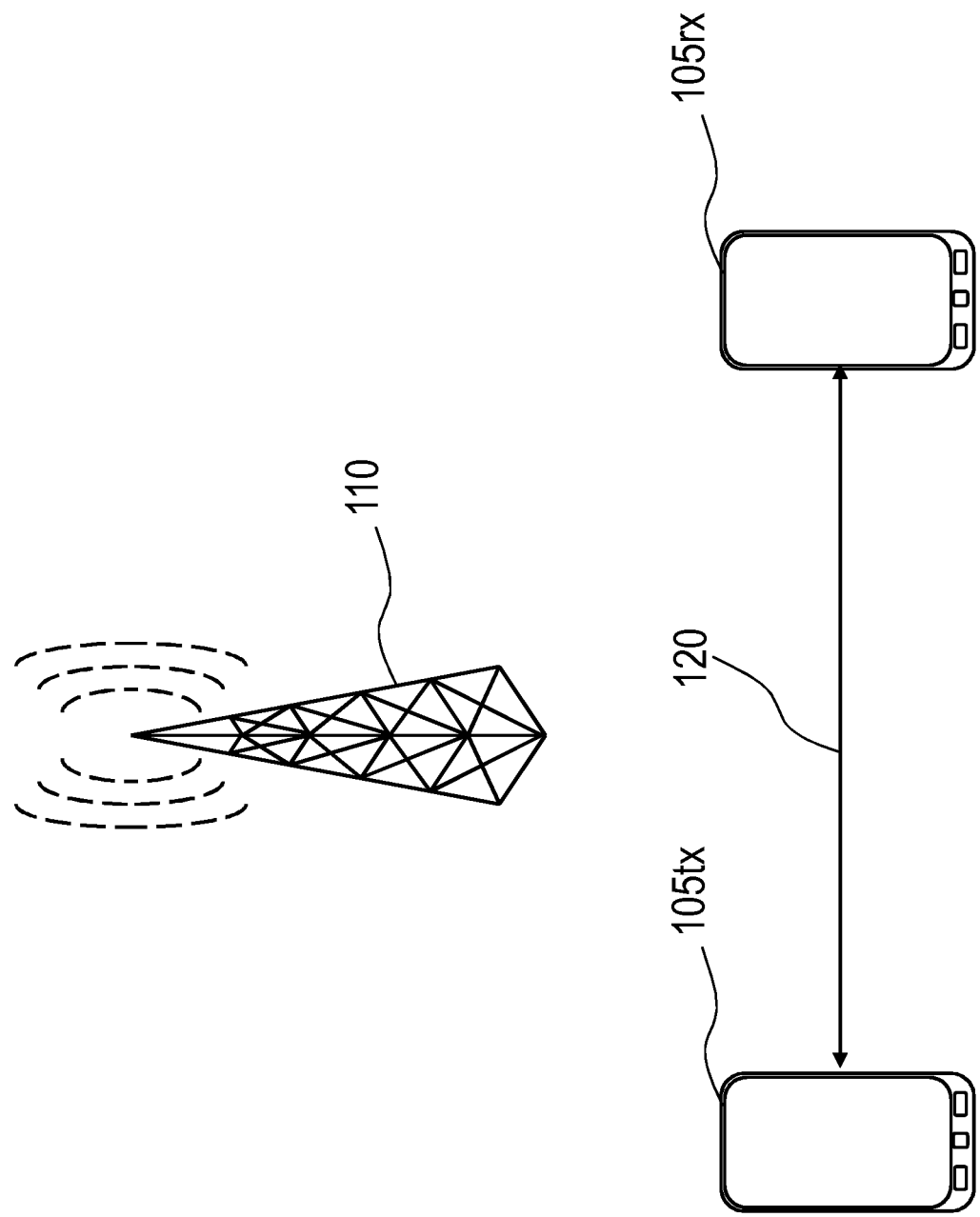
FIG. 1B is a radio network arrangement in which two User Equipment communicate through a Direct Mode connection.

With reference to the drawings, FIGS. 1A and 1B is a radio network arrangement in which two User Equipment, or UE 105 (e.g., a smartphone, a tablet, a laptop/notebook, etc.), communicate through an Infrastructure Mode, or IM, connection and through a Direct Mode, or DM, connection, respectively.

In the IM connection (as shown in FIG. 1A), a transmitter UE 105$tx$ establishes an uplink, or UL, 'leg' 115$ul$ of the connection with a respective "serving" radio transceiver station of the radio network, e.g. an evolved Node B, eNB 110 in 3GPP Long Term Evolution (LTE)/LTE Advanced (LTE-A) systems, and transfers communication data (e.g. data packets) to be received by a receiver UE 105$rx$ to the eNB 110. Then, the eNB 110 transmits the data packets to the receiver UE 105$rx$ by establishing a downlink, or DL, leg 115$dl$ of the connection with the receiver UE 105$rx$.

Conversely, in DM connection (as shown in FIG. 1B) the transmitter UE 105$t$ transfers communication data directly to the receiver UE 105$rx$ by establishing a sidelink 120 with the latter.

During communication, user and control data to be transmitted by the transmitter UE 105$tx$ are processed by the packet data convergence protocol (PDCP), the radio link control (RLC) protocol and the medium access control (MAC) protocol, before being passed to the physical layer for (radio) transmission.

Figure 2:
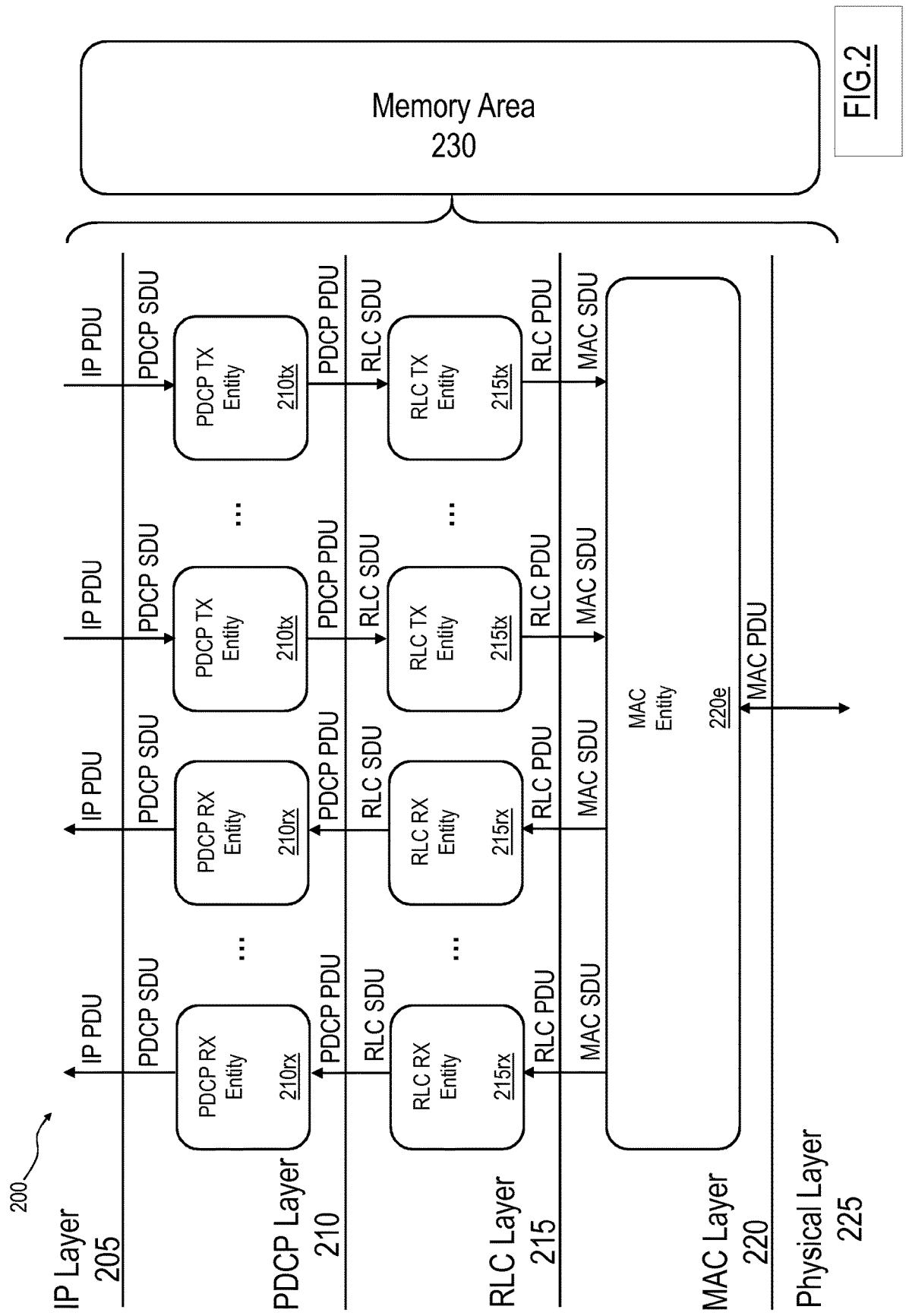
FIG. 2 schematically shows a portion of a protocol layer stack.

For example, by making reference to FIG. 2 that is a schematic representation of a portion of the protocol layer stack 200, the transmission of data packets proceeds in the following manner.

At the transmitter UE 105$tx$, information data generated at higher protocol layers (e.g., by software applications) descends the protocol stack being processed substantially at each layer before being transmitted.

Preferably, at each layer of the protocol stack one or more protocol entities (not shown) are implemented for managing the transmission or reception of data belonging to each data flow (e.g., data belonging to a same communication between UE 105; e.g., a voice communication, an audio/video streaming, a file transfer, etc.).

Generally, the protocol entities are arranged for buffering and/or processing (e.g., segmenting, concatenating, ciphering and/or deciphering) data packets received from adjacent layers and/or for generating data packets to be provided to the adjacent layers.

It should be noted that the term 'protocol entity' or more generally the term 'entity' is herein intended to denote a function the implementation of which may comprise, being not limited to hardware, firmware, a combination of hardware and software, or software.

In detail a protocol entity may be, but is not limited to being, a process running on a processor, a processor, an object, an executable, a thread of execution, a program, and/or a computing device (e.g., the UE 105, the eNB 110, as well as other radio network elements).

In other words, an entity may comprise an application being executed on a computing device and/or the computing device itself.

One or more entities may be localized on one computing device and/or distributed between two or more computing devices.

Entities may comprise and/or interact with computer readable media storing data according to various data structures.

The entities may communicate by exploiting local and/or remote processes, preferably by means of electrical, electromagnetic and/or optical signals providing one or more data packets, such as data packets from one entity interacting with another entity in a local system, in a distributed system, and/or across a radio network and/or a wired network.

Particularly, after being processed at an Internet Protocol (IP) Layer 205, data belonging to a data flow are subdivided in data packets, i.e. IP data packets or IP PDUs (where PDU is a generic name for a data packet outputted by a layer) at the IP layer 205.

The IP data packets are transferred to a PDCP layer 210, where they are denoted to as PDCP Service Data Units, or SDUs at the PDCP layer 210. It should be noted that data packets received by a layer are generally called Service Data Units (SDUs).

At the PDCP layer 210 PDCP Packet Data Units, or PDUs are generated, e.g. by segmenting and/or otherwise processing PDCP SDUs previously received. The PDCP PDUs are sent to a RLC layer 215 where are received as corresponding RLC SDUs.

Preferably, at the PDCP layer 210 one or more PDCP transmitter entities 210$tx$ are provided for generating the PDCP PDUs to be transmitted. More preferably, each PDCP transmitter entity 210$tx$ comprised in the PDCP layer 210 is arranged for generating PDCP PDUs of a respective data flow being transmitted.

At the RLC layer 215, RLC SDUs are segmented and processed thus producing corresponding RLC PDUs. The RLC PDUs are submitted to a MAC layer 220 (where are considered as MAC SDUs).

Preferably, at the RLC layer 215 one or more RLC transmitter entities 215$tx$ are provided for generating the RLC PDUs to be transmitted. More preferably, each RLC transmitter entity 215$tx$ comprised in the RLC layer 215 is arranged for generating RLC PDUs of a respective data flow being transmitted. Particularly, each RLC transmitter entity 215*tx* receives PDCP PDUs (i.e., RLC SDUs) from a respective PDCP transmitter entity 210*tx* managing data packets of the same data flow.

At the MAC layer 220 a MAC header is added to the MAC SDUs and a padding may be implemented to fit MAC SDUs in Transmission Time Interval, or TTI. Afterwards, MAC PDU are transferred to a physical layer 225 for being transmitted onto physical channels.

Preferably, at the MAC layer 220 a MAC managing entity 220*mag* is provided for generating the MAC PDUs to be transmitted. More preferably, the MAC managing entity 220*mag* comprised in the MAC layer 220 is arranged for generating MAC PDUs of each data flow being transmitted. Particularly, the MAC managing entity 220*mag* receives RLC PDUs (i.e., MAC SDUs) from all the RLC transmitter entities 215*tx* at the RLC layer 215.

Similarly, (transmitted) data received at the physical layer of the receiver UE 105*r* are processed by the layers of the protocol stack, particularly the medium access control (MAC) protocol, the radio link control (RLC) protocol and packet data convergence protocol (PDCP), before the user and control data are passed to higher layer of the protocol stack (applying substantially the same procedures just described in a reverse order as described in the following).

To this extent, at the MAC layer 220 the MAC managing entity 220*mag* is further arranged for managing the MAC PDUs received. More preferably, the MAC managing entity 220*mag* comprised in the MAC layer 220 is arranged for managing MAC PDUs of each data flow being received.

Particularly, the MAC managing entity 220*mag* provides MAC SDUs (i.e., RLC PDUs) extracted from received MAC PDUs to a respective RLC receiver entity 220*rx* managing data packets of the corresponding data flow.

At the RLC layer 215 one or more RLC receiver entities 215*rx* are provided for managing the RLC PDUs received. More preferably, each RLC receiver entity 215*rx* comprised in the RLC layer 215 is arranged for managing RLC PDUs of a respective data flow being received. Particularly, each RLC receiver entity 215*rx* provides RLC SDUs (i.e., PDCP PDUs) extracted from received RLC PDUs to a respective PDCP receiver entity 210*rx* managing data packets of the same data flow.

At the PDCP layer 210 one or more PDCP receiver entities 210*rx* are provided for managing the PDCP PDUs received. More preferably, each PDCP receiver entity 210*rx* comprised in the PDCP layer 210 is arranged for managing PDCP PDUs of a respective data flow being received.

According to an embodiment of the invention, the protocol entities (such as for example the transmitter entities 210*tx*, 215*tx*, 220*tx* and the receiver entities 210*rx*, 215*rx*, 220*rx*) may access and use a same memory area 230 (which may be localized on one computing device and/or distributed between two or more computing devices). In other words, the memory area 230 is a shared resource among the protocol entities.

Advantageously, at one or more layers the respective PDUs may be ciphered by means of respective ciphering keys and numbered in order that the PDUs may be ordered in a sequence (and thus correctly reconstruct data therein contained) once received at the receiver UE 105*rx*.

In a DM connection the transmitter UE 105*tx* and receiver UE 105*rx* have PDCP and RLC peering established—i.e., ciphering keys and sequence numbers used by the transmitter UE 105*tx* are known by the receiver UE 105*rx*—, in order to allow the receiver to correctly order and decipher the PDUs.

Conversely, in an IM connection an uplink (UL) peering is established between the transmitter UE 105*tx* and the eNB 110, while a downlink (DL) peering is established between the eNB 110 and the receiver UE 105*rx*. The UL peering exploits different sequencing numbers and ciphering/deciphering keys for RLC PDUs transmitted by the transmitter UE 105*tx* than the sequencing numbers and ciphering/deciphering keys for RLC PDUs transmitted by the eNB 110 exploited in DL peering.

Figure 3:
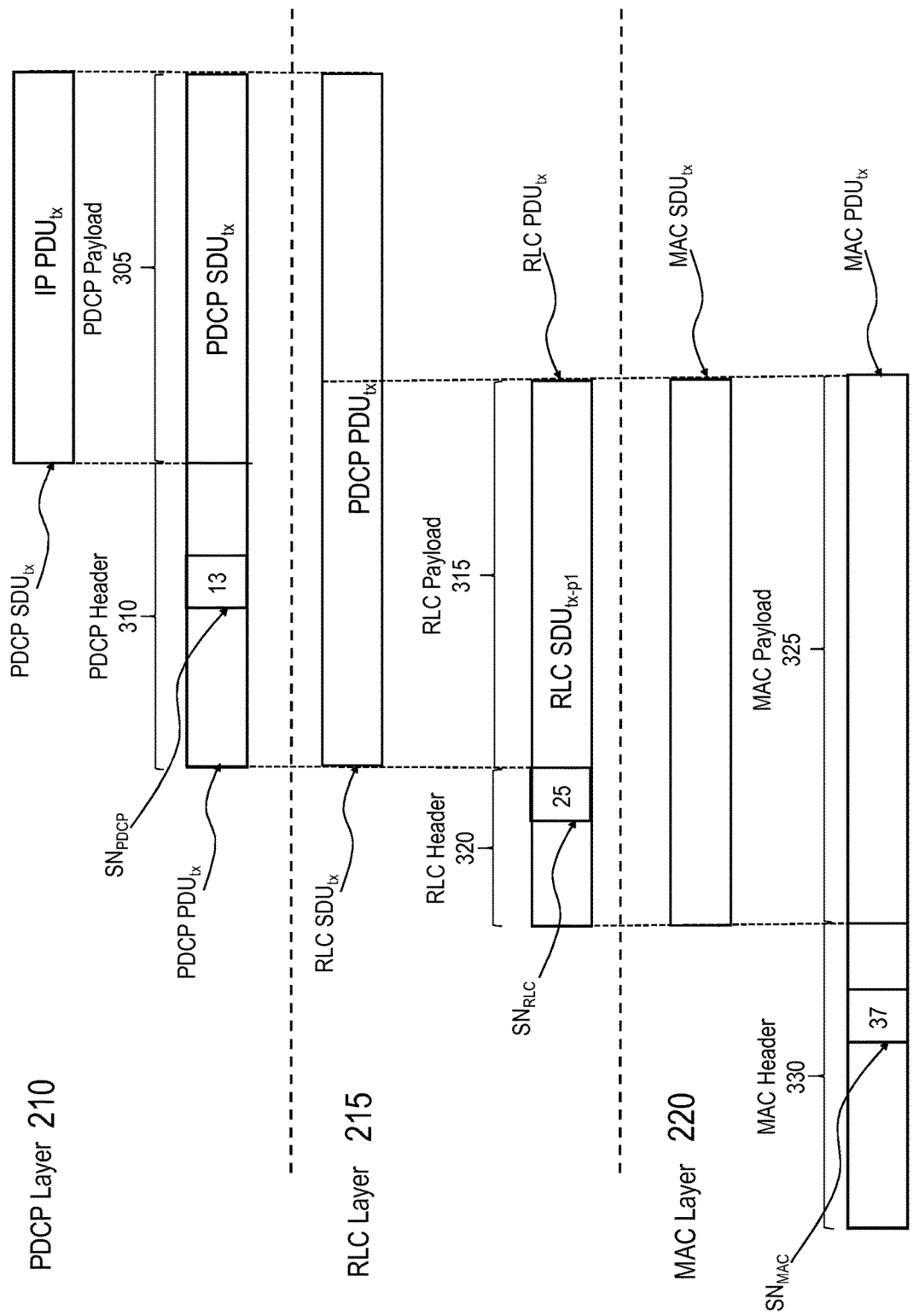
FIG. 3 is a schematic representation of a data packet being sequentially processed at the PDCP layer, the RLC layer and the MAC layer of the protocol stack at a transmitter UE.

FIG. 3 is a schematic representation of a data packet being sequentially processed at the PDCP layer 210, the RLC layer 215 and the MAC layer 220 of the protocol stack at the transmitter UE 105*tx* during a transmission process.

Each data packet from the IP layer 205, such as for example the IP $PDU_{tx}$ in FIG. 3, is received as a PDCP SDU at the PDCP layer 210, i.e. the PDCP $SDU_{tx}$ of FIG. 3.

The PDCP $SDU_{tx}$ forms a payload 305 of a corresponding PDCP PDU, i.e. the PDCP $PDU_{tx}$ in FIG. 3, which may be preferably ciphered with a RLC ciphering key.

The PDCP $PDU_{tx}$ further comprises a header 310 which is combined with the payload 310, the header 310 comprises a sequence number $SN_{PDCP}$ for identifying the PDCP $PDU_{tx}$ in a sequence of PDCP PDUs belonging to a same data flow.

The PDCP $PDU_{tx}$ is then transferred to the RLC layer 215 where it is considered a RLC SDU, i.e. the RLC $SDU_{tx}$ in FIG. 3.

At least a portion of the RLC $SDU_{tx}$, i.e. the portion RLC $SDU_{tx-p1}$ in FIG. 3, is used for forming a payload 315 of a corresponding RLC PDU, i.e. the RLC $PDU_{tx}$ in FIG. 3, which may be preferably ciphered with a RLC ciphering key.

Preferably, a (bit) size of the RLC $PDU_{tx}$ is determined based on the CQI assessed by the transmitter UE 105*tx* on the sidelink 120 in case of a DM connection or based on the CQI assessed by the eNB 110 on the UL leg 115*ul* of an IM connection.

The RLC $PDU_{tx}$ further comprises a RLC header 320 which is combined with the payload 315. The RLC header 320 comprises a sequence number $SN_{RLC}$ identifying the RLC $PDU_{tx}$ in a sequence of RLC PDUs belonging to a same data flow.

The RLC $PDU_{tx}$ is passed to the MAC layer 220, where it is considered as a MAC SDU, i.e. the MAC $SDU_{tx}$ in FIG. 3.

At the MAC layer 220, the MAC $SDU_{tx}$ forms a payload 325 of a corresponding MAC PDU, i.e. MAC $PDU_{tx}$ of FIG. 3.

The MAC $PDU_{tx}$ further comprises a MAC header 330 which is combined with the MAC payload 325. The MAC header 330 comprises a sequence number $SN_{MAC}$ identifying the MAC $PDU_{tx}$ in a sequence of RLC PDUs belonging to a same data flow.

Afterwards, the MAC $PDU_{tx}$ is passed to the physical layer 225 where is processed and transmitted to the receiver UE 105*rx* through the sidelink 120.

At the receiver UE 105*rx* in case of the DM connection, or at the eNB 110 in case of the IM connection, the MAC $PDU_{tx}$ is received at the physical layer 225 and is delivered to the MAC layer 220.

According to the Hybrid-Automatic Repeat reQuest, or H-ARQ, once the MAC $PDU_{tx}$ is received at the receiver UE 105*rx* a corresponding feedback message (i.e., an acknowledge of receipt) is generated and sent back to the transmitter UE 105*tx* in order to communicate the latter a correct or incorrect receipt of the MAC $PDU_{tx}$ (as known in the art and not herein discussed further for the sake of conciseness).

In an embodiment of the invention, at the transmitter UE 105*tx* a copy of each IP data packet that is transferred to the lower layers, particularly to the PDCP layer 210 is maintained at the IP layer 205 until it is ascertained that such IP data packet has been received at the receiver UE 105*rx*.

Figure 4:
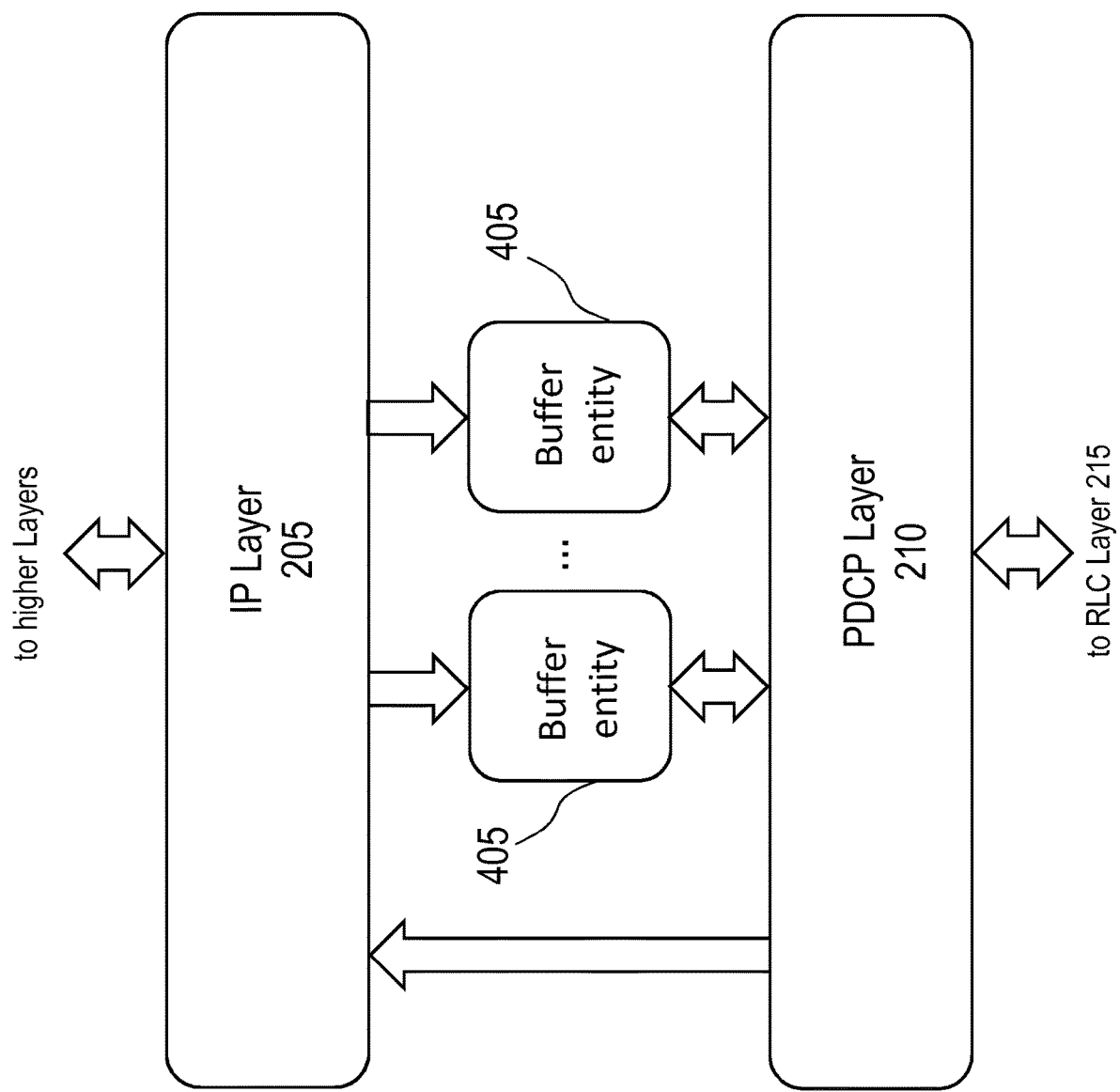
FIG. 4 illustrates buffer protocol entities implemented in the protocol stack of an UE.

For example, as shown in FIG. 4 that illustrates buffer protocol entities implemented in the protocol stack of an UE 105—i.e., both the transmitter UE 105*tx* and the receiver 105*rx* since their role may (and usually do) switch during a communication (i.e., the receiver UE 105*rx* may transmit data to the transmitter UE 105*tx*), according to an embodiment of the invention.

In an embodiment of the invention, above the PDCP Layer 210, e.g. at a sublayer provided between the IP layer 205 and the PDCP Layer 210, one or more buffer entities 405 are provided.

The buffer entities 405 are arranged for buffering (i.e., storing) a copy of each IP data packet that is transferred from IP layer 205 and to the PDCP Layer 210.

Preferably, each buffer entity 405 is coupled with both the IP layer 205 and the PDCP Layer 210 and is arranged for buffering data packets associated with a respective data flow.

According to an embodiment of the present invention, a cross-layer interaction is further implemented in order to determine that the IP data packet has been received at the receiver UE 105*rx*.

Preferably, the cross-layer interaction is implemented in such a way to propagate feedback messages of correct receipt, or acknowledge of receipt (or ACK) information regarding data packets sent by the transmitter UE 105*tx* received at the MAC layer 220 up to the RLC layer 215 and to the PDCP layer 210. In this way, protocol entities at the PDCP layer 210, such as for example the PDCP transmitter entity 210*tx* which generated the PDCP PDU comprising a considered IP data packet, may signal to the buffer entities 405 to remove the copy of data packets for which respective acknowledge have been received.

As described above, each IP data packet is processed and, possibly, segmented when traversing lower protocol layers, i.e. PDCP layer 210, RLC layer 215 and MAC layer 220, down to the physical layer 225.

Therefore, the segments generated at each lower protocol layer for each IP data packet are identified and tracked in order to determine whether the IP data packet has been received at the receiver UE 105*rx*.

Preferably, a map is generated for identifying and tracking each PDCP PDU, which comprises a corresponding PDCP SDU (i.e., an IP data packet), while is passed to lower layers and converted in one or more RLC PDUs and MAC PDUs. Moreover, it is monitored the receipt of all the MAC PDUs.

In other words, for each IP data packet to be sent the map comprises information regarding all the data packets (PDCP PDUs, RLC PDUs, and MAC PDUs) originated at lower protocol layers from the considered IP data packet before transmission at the physical layer 225 and of their reception at the receiver UE 105*rx*.

In an alternative embodiment of the invention (not shown), the one or more buffer entities are implemented at the PDCP layer 210. Each buffer entity in the PDCP layer 210 is arranged for receiving and storing a copy of PDCP SDUs (i.e., IP data packets) inputted at the PDCP layer 210 and passing the PDCP SDUs to a respective PDCP TX entity.

According to an embodiment of the present invention, each map is stored within a respective auxiliary data structure, which is built while the IP data packet is processed by the lower layers of the protocol stack.

Preferably, the auxiliary data structure is implemented in the memory area 230 accessible by the protocol entities (such as for example the transmitter entities 210*tx*, 215*tx*, 220*tx* and the receiver entities 210*rx*, 215*rx*, 220*rx*) of the protocol stack.

Figure 5:
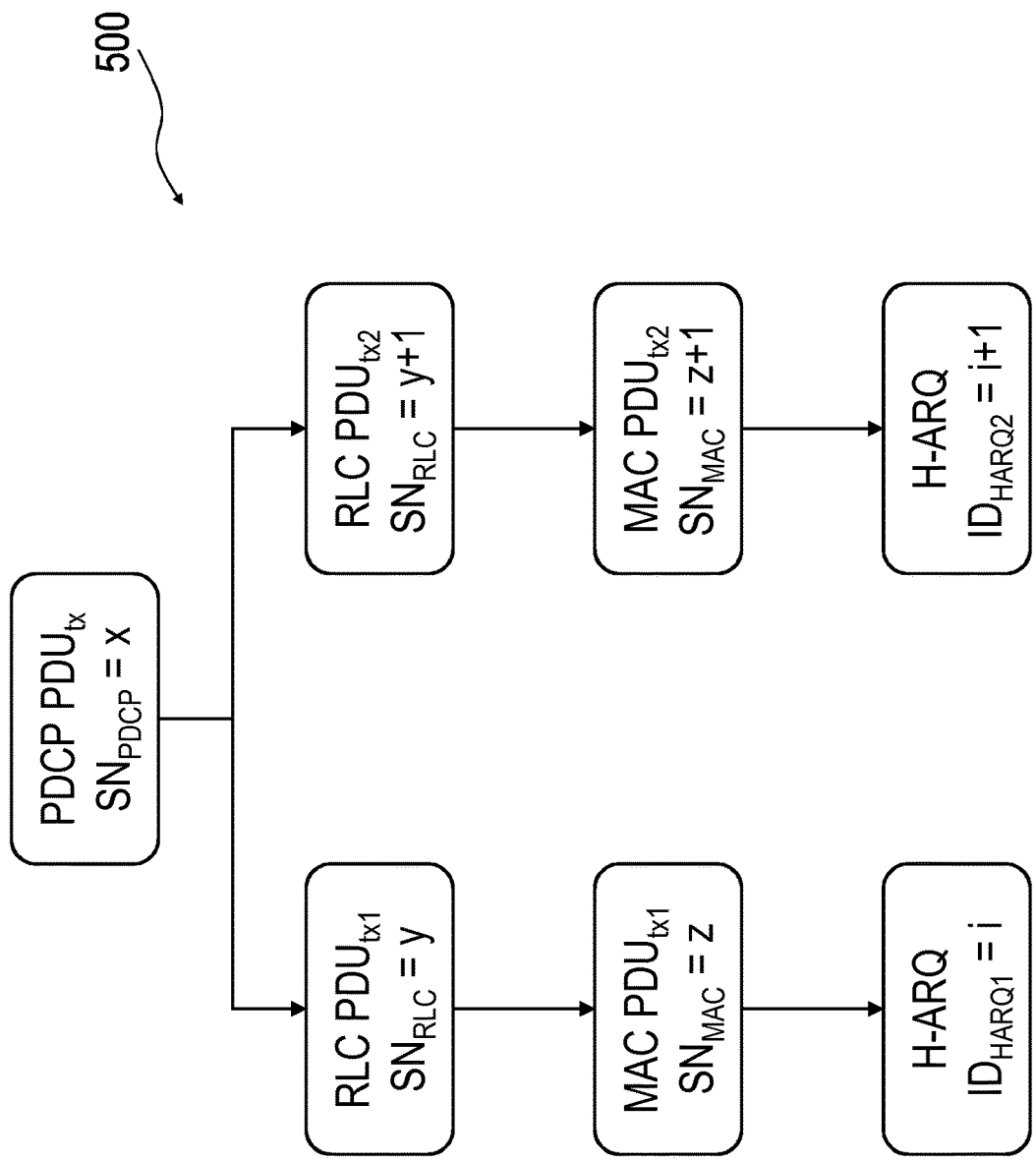
FIG. 5 shows an auxiliary data structure arranged for mapping a generic Packet Data Unit of the PDCP layer.

For example, FIG. 5 shows an example of the auxiliary data structure 500 arranged for mapping a generic PDCP $PDU_{tx}$ identified by a respective identifier, such as for example a respective sequence number x (i.e., $SN_{PDCP}$=x in FIG. 5).

In this case, the PDCP transmitter entity 210*tx* generating the PDCP $PDU_{tx}$ accesses the memory area 230 and stores in the auxiliary data structure 500 information allowing identifying the PDCP $PDU_{tx}$, preferably comprising the respective sequence number $SN_{PDCP}$=x.

For example, once passed at the RLC layer 215 the PDCP $PDU_{tx}$ is segmented into two RLC PDUs, i.e. the RLC $PDU_{tx1}$ and RLC $PDU_{tx2}$ in FIG. 5, each identified by a respective identifier, such as for example a respective sequence number $SN_{RLC}$ y and y+1 (i.e., $SN_{RLC}$=y and $SN_{RLC}$=y+1 in FIG. 5).

The RLC transmitter entity 215*tx* generating the RLC $PDU_{tx1}$ and RLC $PDU_{tx2}$ accesses the memory area 230 and stores in the auxiliary data structure 500 information allowing identifying both the RLC $PDU_{tx1}$ and RLC $PDU_{tx2}$, preferably comprising the respective sequence number $SN_{RLC}$=y and $SN_{RLC}$=y+1.

Each one of the RLC $PDU_{tx1}$ and RLC $PDU_{tx2}$ are sent to the MAC layer 220, where corresponding MAC PDUs, i.e. the MAC $PDU_{tx1}$ and MAC $PDU_{tx2}$ in FIG. 5, are generated and each identified by a respective identifier, such as for example a sequence number $SN_{MAC}$ z and z+1 (i.e., $SN_{MAC}$=z and $SN_{MAC}$=z+1 in FIG. 5).

The MAC managing entity 220*mag* generating the MAC $PDU_{tx1}$ and MAC $PDU_{tx2}$ accesses the memory area 230 and stores in the auxiliary data structure 500 information allowing identifying both the MAC $PDU_{tx1}$ and MAC $PDU_{tx2}$, preferably comprising the respective sequence number $SN_{MAC}$=z and $SN_{MAC}$=z+1.

The MAC $PDU_{tx1}$ and MAC $PDU_{tx2}$ in FIG. 5 are further processed by H-ARQ entities (not shown) implemented at the MAC layer 220, i.e. H-ARQ processes denoted by corresponding identifiers ID i and 1+1 (i.e., $ID_{HARQ}$=i and $ID_{HARQ}$=1+1 in FIG. 5) are associated with the transmission of MAC $PDU_{tx1}$ and MAC $PDU_{tx2}$.

The MAC managing entity 220*mag* generating the MAC $PDU_{tx1}$ and MAC $PDU_{tx2}$ accesses the memory area 230 and stores in the auxiliary data structure 500 information allowing identifying both the H-ARQ processes denoted by corresponding identifiers ID $ID_{HARQ}$1=i and $ID_{HARQ}$2=1+1.

Once H-ARQ processes complete their cycle, i.e. a corresponding ACK is received from the receiver UE 105*rx* for all the H-ARQ processes associated with MAC PDUs derived from a same PDCP PDU, such as the H-ARQ processes identified by $ID_{HARQ}$1=i and $ID_{HARQ}$2=1+1 in FIG. 5, it is possible to mark such PDCP PDU, i.e. the PDCP $PDU_{tx}$ having the sequence number $SN_{PDCP}$=x in FIG. 5, as received at the receiver UE 105*rx*.

For example, MAC managing entity 220*mag* generating the MAC $PDU_{tx1}$ and MAC $PDU_{tx2}$ once verified that the both H-ARQ processes identified by $ID_{HARQ}$1=i and $ID_{HARQ}$2=i+1 are completed identifies the corresponding PDCP $PDU_{tx}$ and generates a receipt completion signal that is routed upwards the protocol stack, up to the respective PDCP transmitter entity 210*tx* indicating that the PDCP $PDU_{tx}$ has been received.

Alternatively, the MAC managing entity 220*mag* generating the MAC $PDU_{rx1}$ and MAC $PDU_{rx2}$ once verified that the both H-ARQ processes identified by $ID_{HARQ}$=i and $ID_{HARQ}$=i+1 adds the information that the H-ARQ processes identified by $ID_{HARQ}$=i and $ID_{HARQ}$=i+1 have been completed and, at the same time, the PDCP transmitter entity 210*tx* that generated the PDCP $PDU_{rx}$ may monitor the auxiliary data structure 500, for detecting completion information provided by the MAC managing entity 220*mag*.

In either way, once the PDCP transmitter entity 210*tx* that generated the PDCP attains the information that the H-ARQ processes identified by $ID_{HARQ}1$=i and $ID_{HARQ}2$=1+1 have been completed it signals to the buffer entity 405 to remove the copy of the PDCP $PDU_{rx}$.

Thus, the auxiliary data structure 500 provides the indication that the copy of an IP PDU, such as for example the IP $PDU_{rx}$ comprised in the payload 305 of FIG. 3, of a received PDCP PDU, such as for example the PDCP $PDU_{rx}$ having the sequence number $SN_{PDCP}$=x in FIG. 3, may be removed from the buffer entity 405

In other words, each copy of the IP PDU is removed from the buffer entity 405 in which is stored once the receipt at the receiver UE 105*rx* has been ascertain at the transmitter UE 105*tx*.

Particularly, the auxiliary structure 500 allows tracking and ascertaining the safe receipt of each portion in which the PDCP PDU may be segmented at the lower layers (RLC layer 215 and MAC layer 220) during the transmission process.

According to an embodiment of the present invention, at a mode switch from a DM connection to an IM connection or, vice versa, from an IM connection to a DM connection, the IP data packets of which corresponding copies are still comprised in the buffer entity 405 are considered as not yet received at the receiver UE 105*rx*.

Therefore, the copies of the IP data packets comprised in the buffer entity 405 are transferred to one or more PDCP entities arranged to manage the communication according to the new connection mode (i.e., IM connection in case of a DM to IM communication mode switch or DM in case of IM to DM communication mode switch).

Thanks to the buffer entity 405 and to the propagation of confirmations of receipt of data packets to the PDCP layer 210 according to the present invention, a reduction of losses and duplicates during a mode switch is attained. In other words, the transmitter UE 105*tx* keeps trace of which data packets have already reached the receiver UE 105*rx* and the transmitter UE 105*tx* can re-transmit only unacknowledged data packets.

It should be noted that, the embodiments according to the present invention do not require additional message exchange among the eNB 110, the transmitter UE 105*tx* and/or receiver UE 105*rx* involved in the communication.

The Applicant has further performed simulations that highlight the benefits of the described solutions.

The Applicant has found that radio network arrangement implementing a mode switch in a radio network arrangement according to the embodiments of the present invention allows for an improvement of cell throughput.

Indeed, reduction in reduction of losses and duplicates implies a throughput improvement particularly (although not limitatively) for data flows using TCP.

As known, TCP data flows (due to the nature of the TCP protocol itself) are susceptible to losses and duplicates, which may cause degradation of the TCP congestion window and consequently reduce the sending rate.

In detail, a radio network arrangement comprising a pair of D2D-capable UE, performing a file transfer using TCP has been considered (such as the radio network arrangement shown in FIGS. 1A and 1B).

During the TCP file transfer the UE cyclically moved (e.g., at a speed substantially equal to 3 m/s) towards each other and in opposite directions, so as to allow periodic mode switching (e.g., triggered whenever a Channel Quality Indicator, or CQI, measured for the current IM or DM connection became lower than the CQI of the other connection mode).

Figure 6:
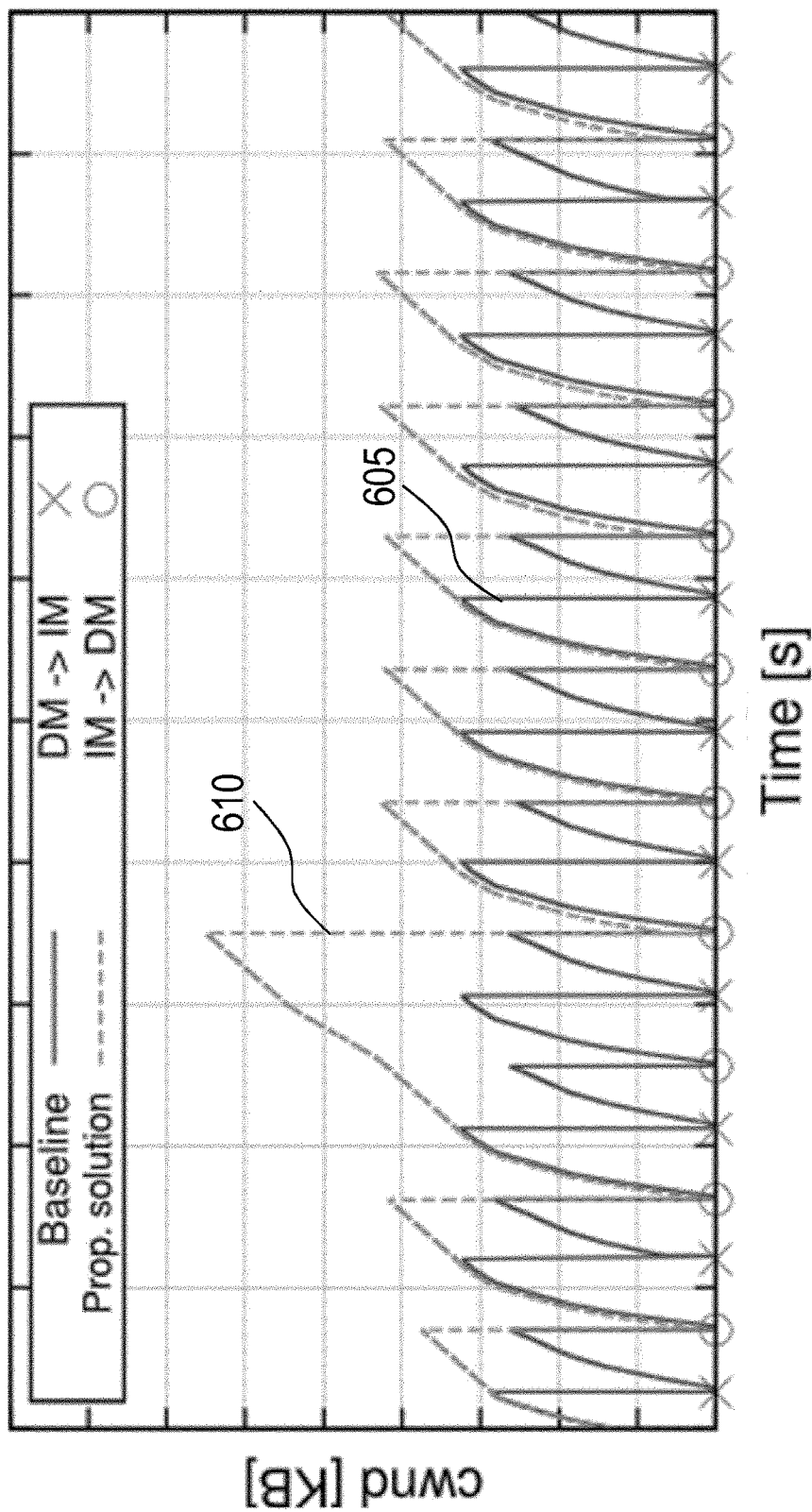
FIG. 6 is a plot of a TCP congestion window as a function of time for a radio network arrangement implementing a mode switching according to an embodiment of the present invention and of a known solution.

FIG. 6 shows the evolution of the TCP congestion window (measured in KB) over time (measured in seconds).

In FIG. 6, crosses and circles indicate time instants at which a mode switch is triggered; particularly, crosses indicate DM connection to IM connection mode switches, while circles indicate IM connection to DM connection mode switches.

The solid line 605 refers to a radio network arrangement of the known art (used as a baseline for comparison), i.e. in which the solution according to the present invention is not implemented. In this case, at mode switch all buffered data packets are dropped and no attempt to recover them (in the LTE stack) is made, which is a behavior of known 3GPP-compliant UE during a mode switch.

Such data packets drop lead to a reduction (substantially a reset) of the TCP congestion window at every mode switch, as can be clearly appreciated from FIG. 6.

Conversely, the dashed line 610 refers to a radio network arrangement implementing a mode switch in a radio network according to the embodiments of the present invention.

As can be appreciated from FIG. 6, the radio network arrangement implementing the solution according to embodiments of the present invention substantially mitigates reductions of the TCP congestion window over time.

In the solution according to embodiments of the present invention, a reduction of the window may occur only in correspondence of switching from IM connection to DM connection, due to the fact that some data packets received at the eNB 110 are sent to the receiver UE 105*rx*, through the DL leg 115*dl*, simultaneously to, or after that, the same data packets (obtained from the copy buffered in the buffer entity 405) has been sent by the transmitter UE 105*tx*, using the sidelink 120 after a switching to a DM connection, hence generating out-of-order receptions.

The out-of-order receptions, in their turn, generate duplicate TCP acknowledgments that trigger the reduction of the congestion window in correspondence of IM connection to DM connection mode switches.

Nevertheless, thanks to the solution according to embodiments of the present invention the occurrences of congestion window reduction are at least halved with respect to known solutions.

Figure 7:
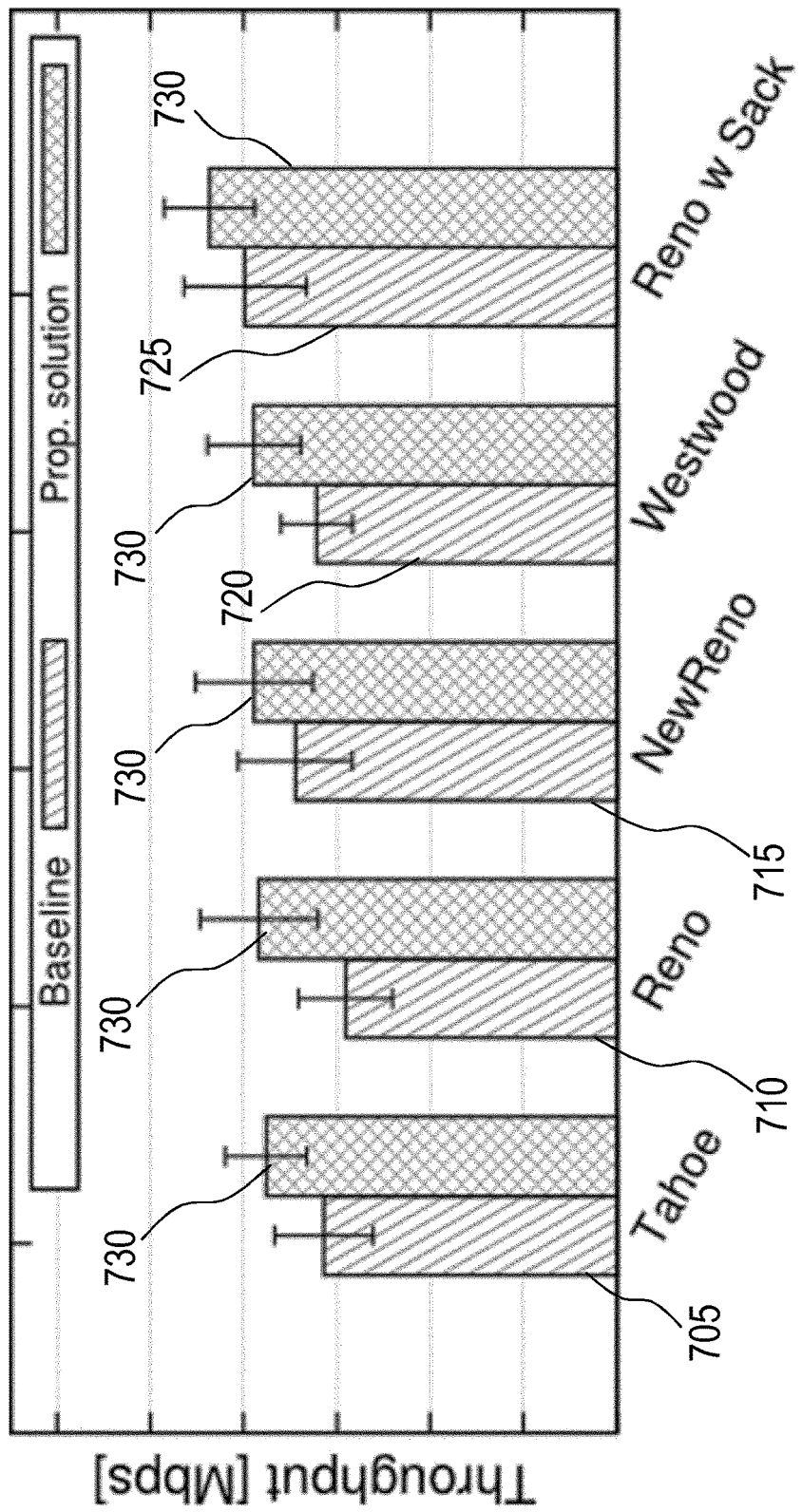
FIG. 7 is a schematic bar chart comparing a throughput achieved by a radio network arrangement implementing the mode switching according to an embodiment of the present invention with a throughput achieved by a radio network arrangement implementing TCP congestion control algorithm known in the art.

FIG. 7 is a bar chart showing application layer throughputs associated with the considered TCP file transfer.

Particularly, different radio network arrangements, each implementing a respective TCP congestion control algorithm known in the art, have been tested and compared (in terms of application layer throughput) with a radio network arrangement implementing the solution according to the present invention.

In detail, bin 705 refers to a radio network arrangement implementing Tahoe algorithm, bin 710 refers to a network arrangement implementing Reno algorithm, bin 715 refers to a radio network arrangement implementing New Reno algorithm, bin 720 refers to a radio network arrangement implementing Westwood algorithm, and bin 725 refers to a radio network arrangement implementing Reno with Selective Acknowledgements algorithm, while bins 730 refers to a radio network arrangement implementing the solution according to the present invention.

The Applicant observed that the application layer throughput is always substantially higher in the radio network arrangement implementing the mode switch according to the present invention with respect to radio network arrangements implementing known TCP congestion control algorithms.

The invention claimed is:

1. A method for managing data packets transmitted by a first user equipment to be received by a second user equipment, wherein the first user equipment is arranged for communicating with the second user equipment in a direct mode by directly connecting to the second user equipment or in an infrastructure mode by connecting to the second user equipment through a radio transceiver station of a radio network, the first user equipment being configured for:
   generating data packets at an Internet Protocol layer of the protocol stack to be transmitted;
   forwarding each data packet to a lower protocol layer of the protocol stack in order to be sent to the second user equipment in direct mode or in infrastructure mode,
   providing at least one buffer protocol entity below the Internet Protocol layer, wherein the at least one buffer protocol entity is arranged for:
      storing a copy of each data packet forwarded from the Internet Protocol layer to the lower protocol layer;
      removing the copy of a data packet stored in the buffer protocol entity upon acknowledgement of the receipt of the corresponding data packet at the second user equipment, and
      in case the first user equipment switches from communicating with the second user equipment in the direct mode to the infrastructure mode or from the infrastructure mode to the direct mode:
         forwarding the copy of each data packet comprised in the buffer protocol entity to the lower protocol layer of the protocol stack in order to be sent to the second user equipment in infrastructure mode or in direct mode.

2. The method according to claim 1, wherein forwarding each data packet to a lower protocol layer of the protocol stack comprises:
   forwarding each data packet to a Packet Data Convergence Protocol layer of the protocol stack.

3. The method according to claim 1, wherein providing at least one buffer protocol entity below the Internet Protocol layer comprises providing the at least one buffer protocol entity at sublayer provided between the Internet Protocol layer and the Packet Data Convergence Protocol layer of the protocol stack.

4. The method according to claim 1, wherein providing at least one buffer protocol entity below the Internet Protocol layer comprises providing the at least one buffer protocol entity at the Packet Data Convergence Protocol layer of the protocol stack.

5. The method according to claim 1, further comprising:
   for each data packet generated at the Internet Protocol layer, generating at least one respective data packet at each protocol layer of the protocol stack lower than the Internet Protocol layer, and
   wherein removing the copy of a data packet stored in the buffer protocol entity upon acknowledge of the receipt of the corresponding data packet at the second user equipment comprises:
      identifying each data packet at each protocol layer the protocol stack lower than the Internet Protocol layer which has been generated based on the data packet.

6. The method according to claim 5, wherein generating at least one respective data packet at each protocol layer comprises:
   generating at least one first respective data packet at the Packet Data Convergence Protocol layer based on a data packet generated at the Internet Protocol layer;
   generating at least one second respective data packet at a Radio Link Control layer based on each first respective data packet generated at the Packet Data Convergence Protocol layer, and
   generating at least a third respective data packet at a Medium Access Control layer based on each second respective data packet generated at the Radio Link Control layer, and
   wherein identifying each data packet at each protocol layer the protocol stack lower than the Internet Protocol layer comprises:
   storing identifying information of the at least one first respective data packet, the at least one second respective data packet, and at least a third respective data packet.

7. The method according to claim 6, wherein storing identifying information of the at least one first respective data packet, the at least one second respective data packet, and at least a third respective data packet comprises:
   storing a sequence number identifying the at least one respective data packet, the at least one second respective data packet, and the at least a third respective data packet in a sequence of data packets at the respective protocol layer.

8. The method according to claim 7, wherein for each at least a third respective data packet at a Medium Access Control layer a receipt acknowledgement process is implemented for assessing a receipt of the data packet at the a second user equipment, and
   wherein storing identifying information of the at least one first respective data packet, the at least one second respective data packet, and at least a third respective data packet further comprises:
   storing an identifier of a receipt acknowledgement process for each at least a third respective data packet.

9. The method according to claim 8, wherein removing the copy of a data packet stored in the buffer protocol entity upon acknowledge of the receipt of the corresponding data packet at the second user equipment comprises:
   receiving acknowledgement of receipt at the at the Medium Access Control layer;
   checking whether an acknowledgement of receipt associated with each corresponding stored identifier of a receipt acknowledgement process has been received, and
   in the affirmative case, removing the copy of a data packet stored in the buffer protocol entity.

10. The method according to claim 8, wherein at each protocol layer at least one protocol entity is implemented for generating and managing the at least one first respective data packet, the at least one second respective data packet, and at least a third respective data packet, and
    wherein storing identifying information of the at least one first respective data packet, the at least one second respective data packet, and at least a third respective data packet comprises:

storing said identifying information in a memory area accessible by protocol entities at each protocol layer, and wherein storing an identifier of receipt acknowledgement for each at least a third respective data packet comprises:

having at least one protocol entity at the Medium Access Control layer storing in the memory area an identifier of a receipt acknowledgement process for each at least a third respective data packet.

11. The method according to claim 10, further comprising having at least one protocol entity at the Medium Access Control layer storing in the memory area a confirmation information for each identifier of a receipt acknowledgement process.

12. The method according to claim 7, wherein removing the copy of a data packet stored in the buffer protocol entity upon acknowledge of the receipt of the corresponding data packet at the second user equipment comprises, once that an acknowledgement of receipt associated with each corresponding stored identifier of a receipt acknowledgement process has been received:

generating a data packet receipt confirmation at the Medium Access Control layer;

forwarding the packet receipt confirmation to the Packet Data Convergence Protocol layer, and generating a removal signal at the Packet Data Convergence Protocol layer for the buffer protocol entity signaling to remove the data packet.

13. The method according to claim 6, wherein at each protocol layer at least one protocol entity is implemented for generating and managing the at least one first respective data packet, the at least one second respective data packet, and at least a third respective data packet, and wherein storing identifying information of the at least one first respective data packet, the at least one second respective data packet, and at least a third respective data packet comprises:

storing said identifying information in a memory area accessible by protocol entities at each protocol layer.

14. The method according to claim 13, wherein storing said identifying information in a memory area accessible by protocol entities at each protocol layer comprises:

having at least one protocol entity at the Packet Data Convergence Protocol layer storing in the memory area an identifying information of the at least one first respective data packet;

having at least one protocol entity at the Radio Link Control layer storing in the memory area an identifying information of the at least one second respective data packet, and having at least one protocol entity at the Medium Access Control layer storing in the memory area an identifying information of the at least one third respective data packet.

15. A user equipment arranged for transmitting to or receiving from a second user equipment data packets by means of a Direct Mode connection in which data packets are directly transmitted to or received from the second user equipment or by an Infrastructure Mode connection in which data packets are transmitted to or received from the user equipment and the second user equipment through a radio transceiver station of a radio network, the user equipment comprising hardware, firmware, a combination of hardware and software, or software configured for implementing the method according to claim 1.

* * * * *